United States Patent [19]

Cooper

[11] Patent Number: 5,598,538
[45] Date of Patent: Jan. 28, 1997

[54] SCSI MULTIPLEXER FOR COUPLING A COMPUTER LOCAL BUS TO A SHARED PERIPHERAL GLOBAL BUS

[75] Inventor: Andrew Cooper, Hillsdale, N.J.

[73] Assignee: Tektronix, Inc., Wilsonville, Oreg.

[21] Appl. No.: 489,575

[22] Filed: Jun. 12, 1995

Related U.S. Application Data

[63] Continuation of Ser. No. 106,886, Aug. 16, 1993, abandoned.

[51] Int. Cl.$^6$ .................................................... G06F 13/00
[52] U.S. Cl. ............................ 395/281; 395/285; 395/288
[58] Field of Search ................................. 395/325, 281, 395/288, 285

[56] References Cited

U.S. PATENT DOCUMENTS

| | | | |
|---|---|---|---|
| 4,821,170 | 4/1989 | Bernick | 364/200 |
| 5,274,763 | 12/1993 | Banks | 395/250 |
| 5,274,783 | 12/1993 | House et al. | 395/325 |
| 5,333,277 | 7/1994 | Searls | 395/325 |

*Primary Examiner*—Jack B. Harvey
*Assistant Examiner*—John Travis
*Attorney, Agent, or Firm*—Francis I. Gray

[57] ABSTRACT

An improved small computer systems interface multiplexer (SCSI Mux II) provides for coupling of a computer on a local bus with shared peripheral devices on a global bus. The SCSI Mux II is accessed by a pseudo-operation code that includes two local bus identifiers as the identifier for the SCSI Mux II. Once the SCSI Mux II is identified, the computer accesses the SCSI Mux II as a local bus peripheral device and the SCSI Mux II couples the local bus to the global bus by translating the target peripheral device identification into a global identifier to complete the transfer between the computer and the designated shared peripheral device.

1 Claim, 13 Drawing Sheets

SCSI MULTIPLEXER FOR COUPLING A COMPUTER LOCAL BUS TO A SHARED PERIPHERAL GLOBAL BUS

This is a continuation of application Ser. No. 08/106,886, filed Aug. 16, 1993 and now abandoned.

BACKGROUND OF THE INVENTION

The present invention relates to computer networking, and more particularly to an improved small computer systems interface (SCSI) multiplexer that allows the use of modern SCSI controller chips that cannot generate the selection sequence specified in the original SCSI system.

A small computer systems interface multiplexer (SCSI Mux) allows several computer systems to access several shared SCSI mass storage devices or other SCSI peripherals using a single existing SCSI port. It permits each computer to maintain shared and non-shared peripherals, hence the isolation. It allows SCSI bus identification (ID) translation, thereby expanding the number of allowable SCSI devices past the limit of eight. It allows shared, or global, bus locking to insure peripheral possession when doing multiple transfers to a shared device.

The SCSI Mux is inserted between the SCSI bus for each computer, the local bus, and the shared SCSI bus, the global bus. The local devices are isolated in that no other computers can access them through the global bus, although the computer on the local bus can. To access a global device coupled to the global bus, a pseudo-operation code is sent to the SCSI Mux to tell it the bus ID of the global device to be accessed, and whether a bus lock is required. The computer then does a normal SCSI transfer to the local bus ID of the SCSI Mux. The SCSI Mux translates the bus ID using the information sent in the previous pseudooperation code and arbitrates for the global bus. When the global bus is "won", the SCSI Mux connects the local and global buses, and the transfer is completed. At the end of the transfer the buses are disconnected unless a lock is requested, in which case the global bus is held until lock is cleared by the computer system.

The pseudo-operation code provides a way for the computer to send information to the SCSI Mux only, without using any additional SCSI bus IDs. This is done by using a selection sequence with three bits "on", to which no SCSI target device responds. The SCSI Mux recognizes this selection sequence and gets the information needed. The allowable number of SCSI devices is expanded from eight since a single SCSI Mux, using up only one bus ID, may address up to seven more SCSI devices. Up to six SCSI Muxs may be used, allowing up to forty-four SCSI devices. The locking ability provides for the situation where an uninterruptable sequence of SCSI transfers to a shared device is necessary. The SCSI Mux accomplishes this by driving the busy (BSY) line active soon enough after it is released by the target device when the lock is on, not allowing any initiator to detect a bus free phase.

Modern SCSI controller chips cannot generate the "illegal" selection sequence with three bits "on". Therefore another means is required for transferring data to the SCSI Mux.

SUMMARY OF THE INVENTION

Accordingly the present invention provides an improved small computer systems interface multiplexer (SCSI Mux II) for accessing SCSI devices on a global bus. A computer and local peripheral devices are coupled to a local bus, with each local peripheral device having its own local bus identification (ID). At least one SCSI Mux II also is coupled to the local bus, having its own local bus ID. The SCSI Mux II couples the local bus to the global bus when accessed by the computer, and converts a local identification (ID) transmitted to the SCSI Mux II into a global ID for a peripheral on the global bus. The SCSI Mux II receives a pseudo-operation code from the computer, the pseudo-op code being a different local bus ID to send information to that SCSI Mux II only. The information in the pseudo-operation code is used to translate the local bus ID into a global bus ID and to request a global lock and a global reset. Once the SCSI Mux II has arbitrated access to the global bus, the transfer is completed between the requesting computer on the local bus and the peripheral device on the global bus. The process continues until all transfers between the computer and the peripheral device are completed, at which point the computer transmits the pseudo-op code to the SCSI Mux II again to signal the SCSI Mux II to disconnect the global bus from the local bus.

The objects, advantages and novel features of the present invention are apparent from the following detailed description when read in conjunction with the appended claims and attached drawing.

BRIEF DESCRIPTION OF THE DRAWING

FIGS. 8a)–8c) are timing diagrams for resetting the local bus or local and global buses according to the present invention.

DESCRIPTION OF THE PREFERRED EMBODIMENT

Figure 1:
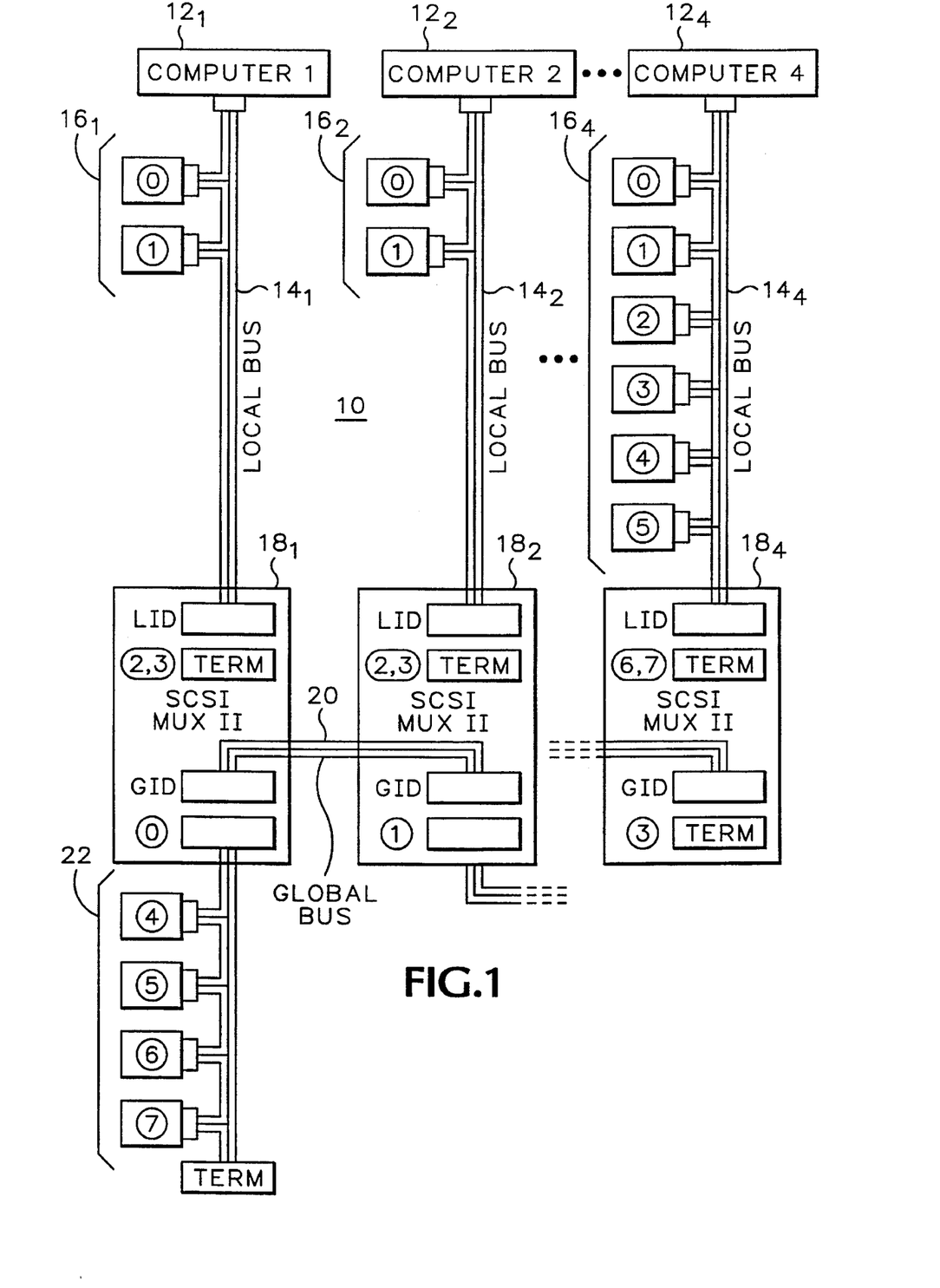
FIG. 1 is a block diagram view of a typical SCSI computer network using SCSI Mux IIs according to the present invention.

Referring now to FIG. 1 a typical SCSI computer network 10 is shown according to the present invention. A plurality of computers 12 are coupled to respective local buses 14. Each computer 12 has its own peripheral devices 16 also coupled to its local bus 14. Also coupled to the respective local buses 14 is a SCSI Mux II 18, each SCSI Mux II providing a termination for each respective local bus. The SCSI Mux IIs also are coupled to a global bus 20 to which are coupled shared peripheral devices 22. Each peripheral device 16 has a unique bus identification (ID), indicated by the number within the circle. The SCSI Mux II 18 requires a pair of local bus IDs. Thus the maximum number of local peripheral devices 16 on the local bus 14 together with the SCSI Mux II 18 is six, as shown for computer $12_4$. Each computer 12 has access to its local peripheral devices 16 as well as to the shared peripheral devices 22 on the global bus 20 via its SCSI Mux II 18.

Figure 2:
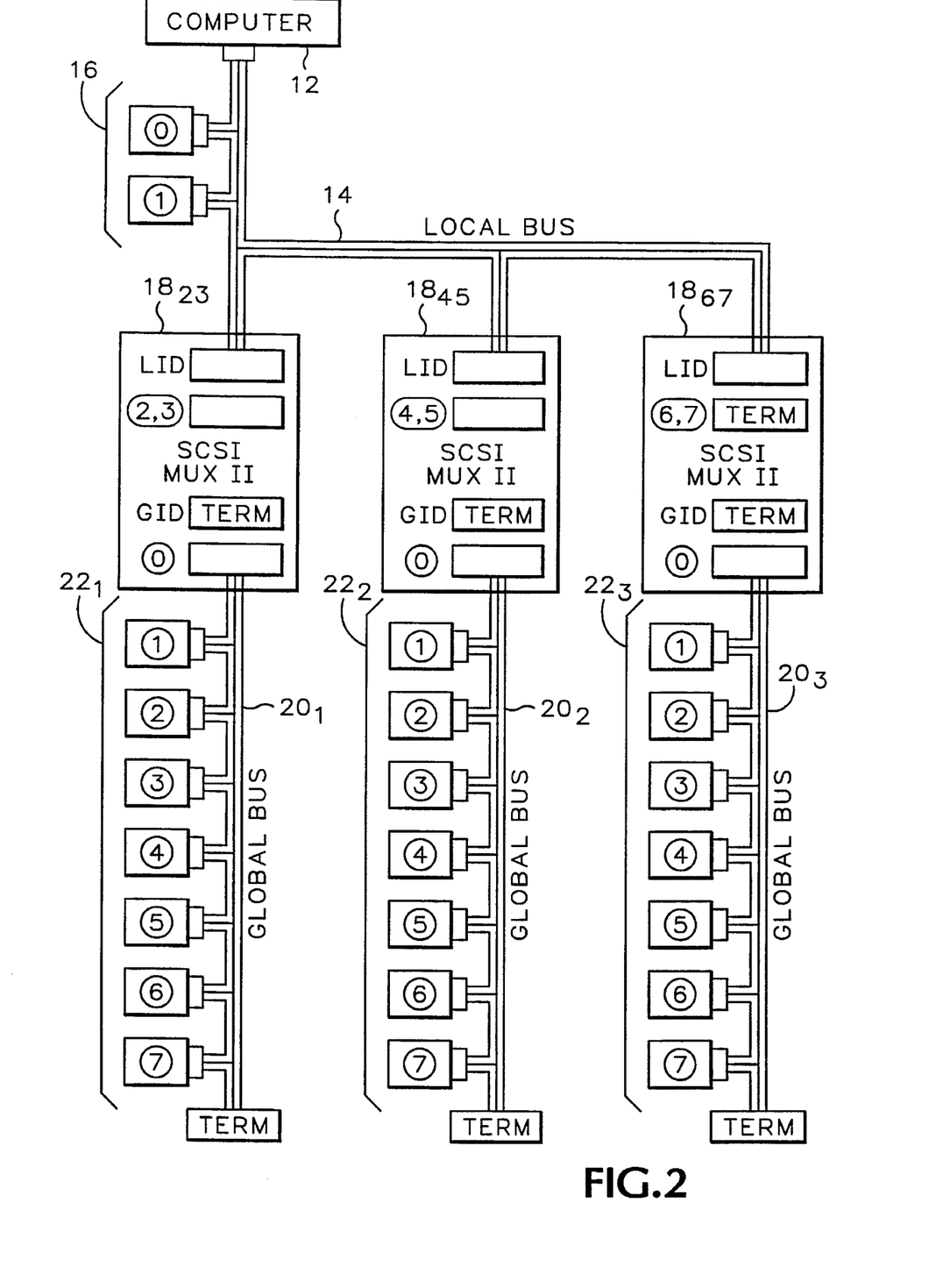
FIG. 2 is a block diagram view illustrating the maximum number of peripheral devices that may be coupled to one computer using SCSI Mux IIs according to the present invention.

The maximum number of peripheral devices that may be coupled to a single computer 12 is shown in FIG. 2. A single computer 12 is coupled to the local bus 14 together with two local peripheral devices 16. Also coupled to the local bus 14 are three SCSI Mux IIs 18. Each SCSI Mux II 18 is coupled to a separate global bus 20, and coupled to each global bus are up to seven shared peripheral devices 22. Thus the single computer 12 may access up to 23 peripheral devices using SCSI Mux IIs 18.

Figure 3:
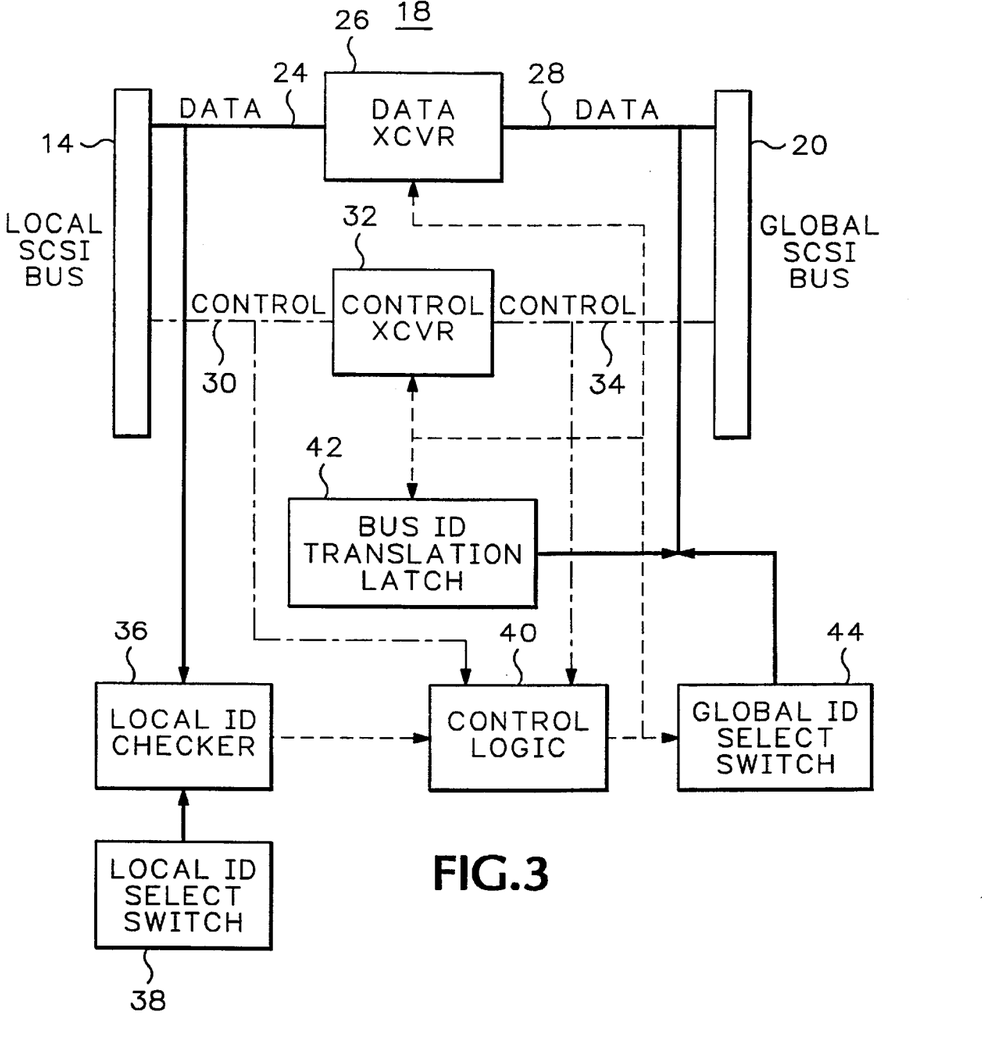
FIG. 3 is a block diagram view of the SCSI Mux II according to the present invention.
Figure 4:
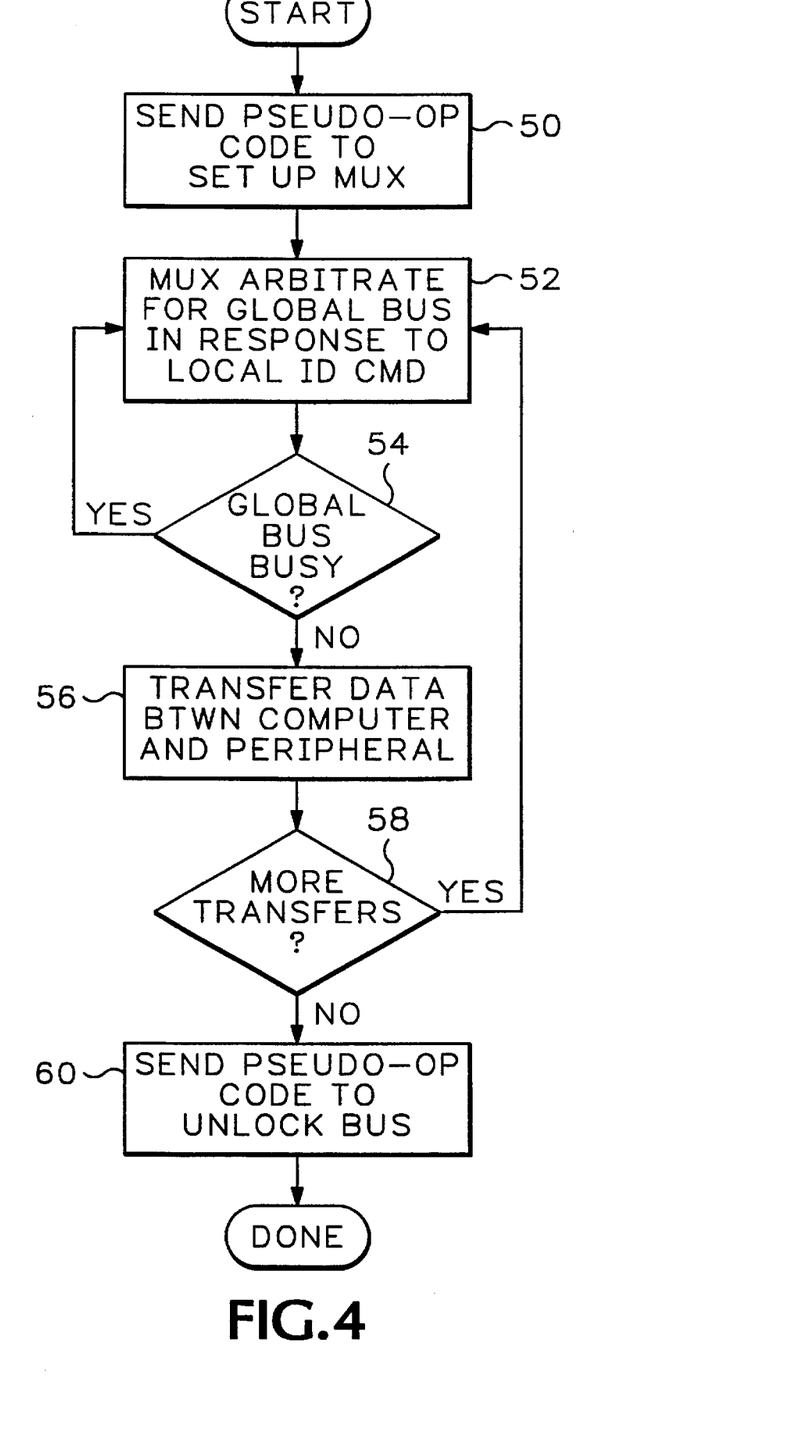
FIG. 4 is a flow chart view of the transfer of data between the computer and a peripheral device according to the present invention.
Figure 5A:
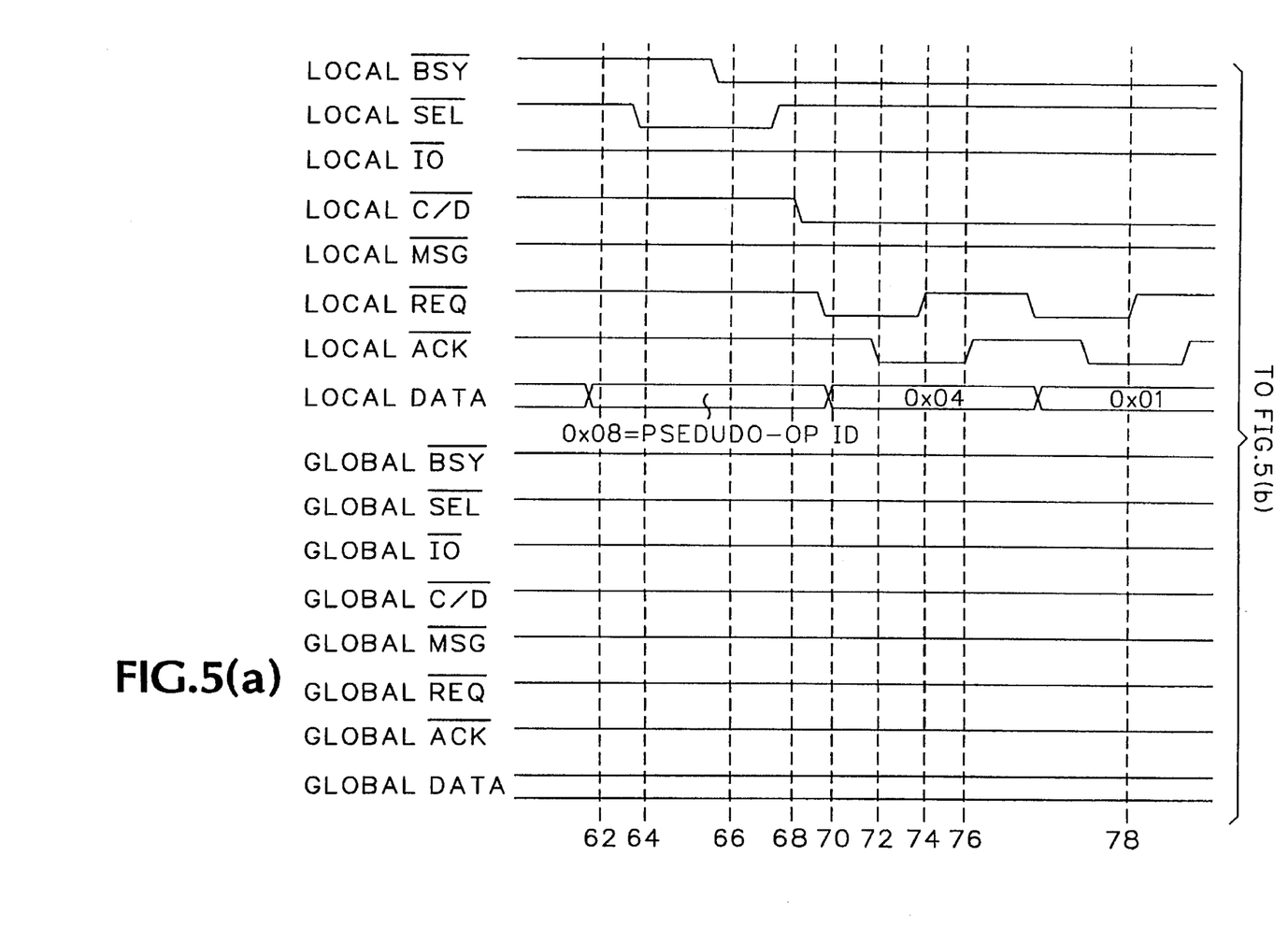
FIG. 5 is a timing diagram for accessing the SCSI MUX II for transfer from the local bus to the global bus according to the present invention.
Figure 5B:
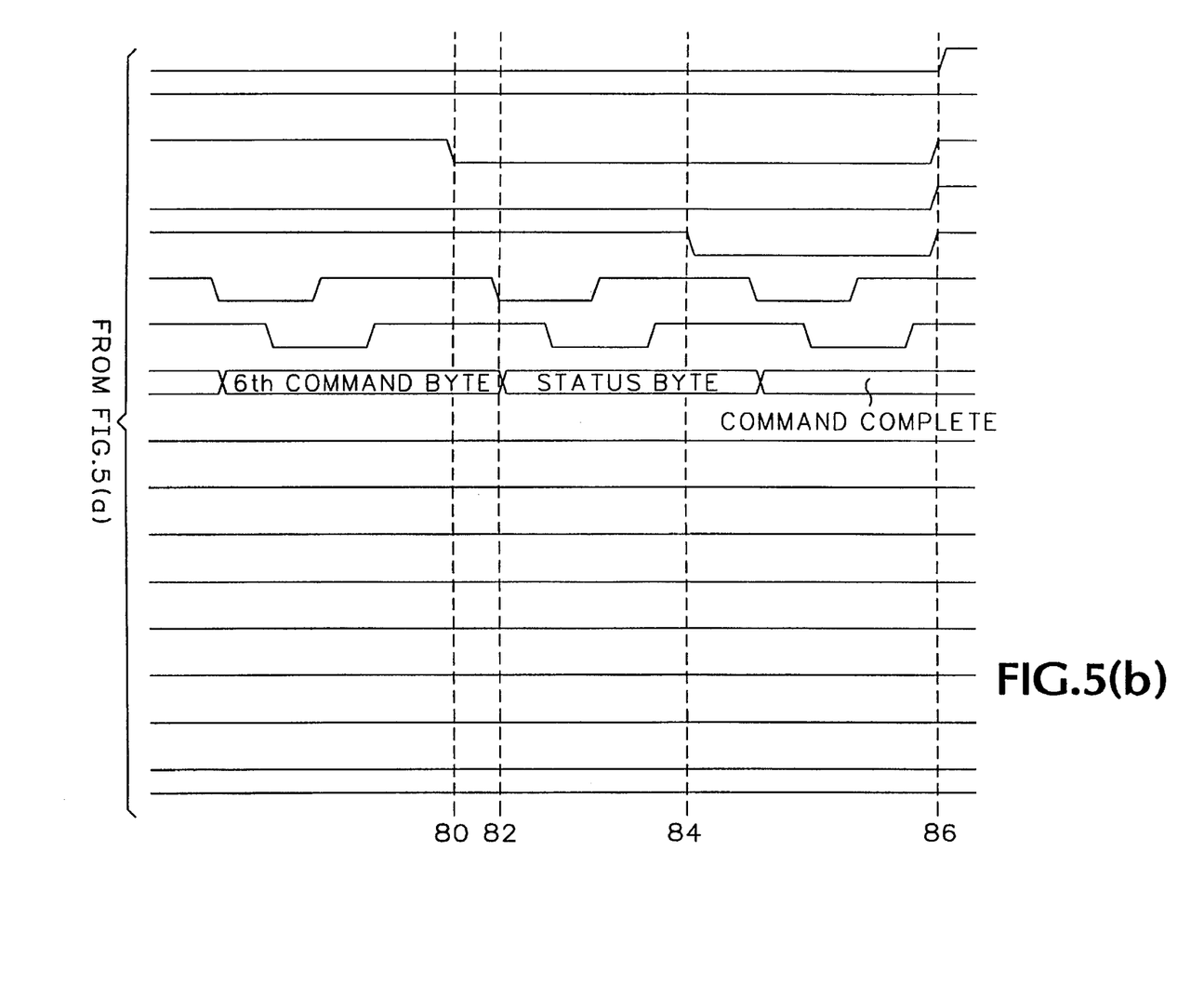

The configuration of the SCSI Mux II 18 is shown in FIG. 3. A data bus 24 portion of the local bus 14 is coupled to a data transceiver 26 which is also coupled to a data bus 28 portion of the global bus 20. A control bus 30 portion of the local bus 14 is coupled to a control transceiver 32 which in turn is coupled to a control bus 34 portion of the global bus 20. The data on the local data bus 24 is input to a local ID check circuit 36. Also input to the local ID check circuit 36 is the local ID for the SCSI Mux II 18 from a local ID select switch 38. When the local ID check circuit 36 recognizes that the SCSI Mux II 18 is being selected according to the pseudo-operation code from the computer 12, a recognition signal is applied to a control logic circuit 40. The local data bus 24 is also applied as an input to a bus ID translation latch 42 to obtain a global ID for the target peripheral device for a subsequent local bus ID during the pseudo-op code sequence.

The local and global control buses 30, 34 are coupled to the control logic circuit 40. The control logic circuit 40 provides control commands to the data transceiver 26, the control transceiver 32, the bus ID translation latch 42 and to a global ID select switch 44 in response to the recognition signal from the local ID checker 36. The bus ID translation latch 42 and the global ID select switch 44 have outputs that provide revised data on the global data bus 28 that represents the target peripheral device 22 and the identification of the SCSI Mux II 18 as the source.

In operation, referring to FIGS. 1, and 3–8, one of the computers 12 desires to communicate with one of the global devices 22. The computer 12 sends the pseudo-op code (0x08) to the SCSI Mux II 18 at time 62 (FIG. 5), as indicated in step 50 of FIG. 4. This turns on bit 3 corresponding to the pseudo-op ID for the SCSI Mux II 18. Then the computer 12 asserts "SEL" at time 64. When both of these conditions occur, the SCSI Mux II 18 senses that it is being addressed and responds to the local bus 14 by asserting "BSY" on the local bus at time 66. The computer 12 deasserts "SEL" at time 68 and the SCSI Mux II 18 starts a normal command transfer by asserting "C/D" and the "REQ" at time 70. The computer 12 responds by sending a first command byte, for example 0x10 which has bit 4 turned on which is the local bus ID corresponding to one of the global devices 22, and asserts "ACK" at time 72. The SCSI Mux II 18 latches this byte in the bus ID translation latch 42 and then deasserts "REQ" at time 74. The computer 12 deasserts "ACK" at time 76. This interlocked REQ/ACK handshake is repeated again for a second command byte which has the least significant bit set (0x01) at time 78. The second command byte sets a lock bit in the control logic 40 of the SCSI Mux II 18. This handshake procedure is repeated four more times, but the data is ignored by the SCSI Mux II 18. The SCSI Mux II 18 asserts "I/O" at time 80 to indicate the direction of the data from the SCSI Mux II to the computer 12. The SCSI Mux II 18 sends a zero word (0x0) to the local data bus 14 and asserts "REQ" at time 82. This indicates normal completion of the pseudo-op code sequence. The handshake is completed as described above. The SCSI Mux II 18 then asserts "MSG" at time 84 and sends a zero byte to the local data bus 14 to indicate the command is complete, and deasserts "I/O", "C/D", "MSG" and "BSY", ending the transfer at time 86. During this time the global bus 20 is idle.

Figure 6A:
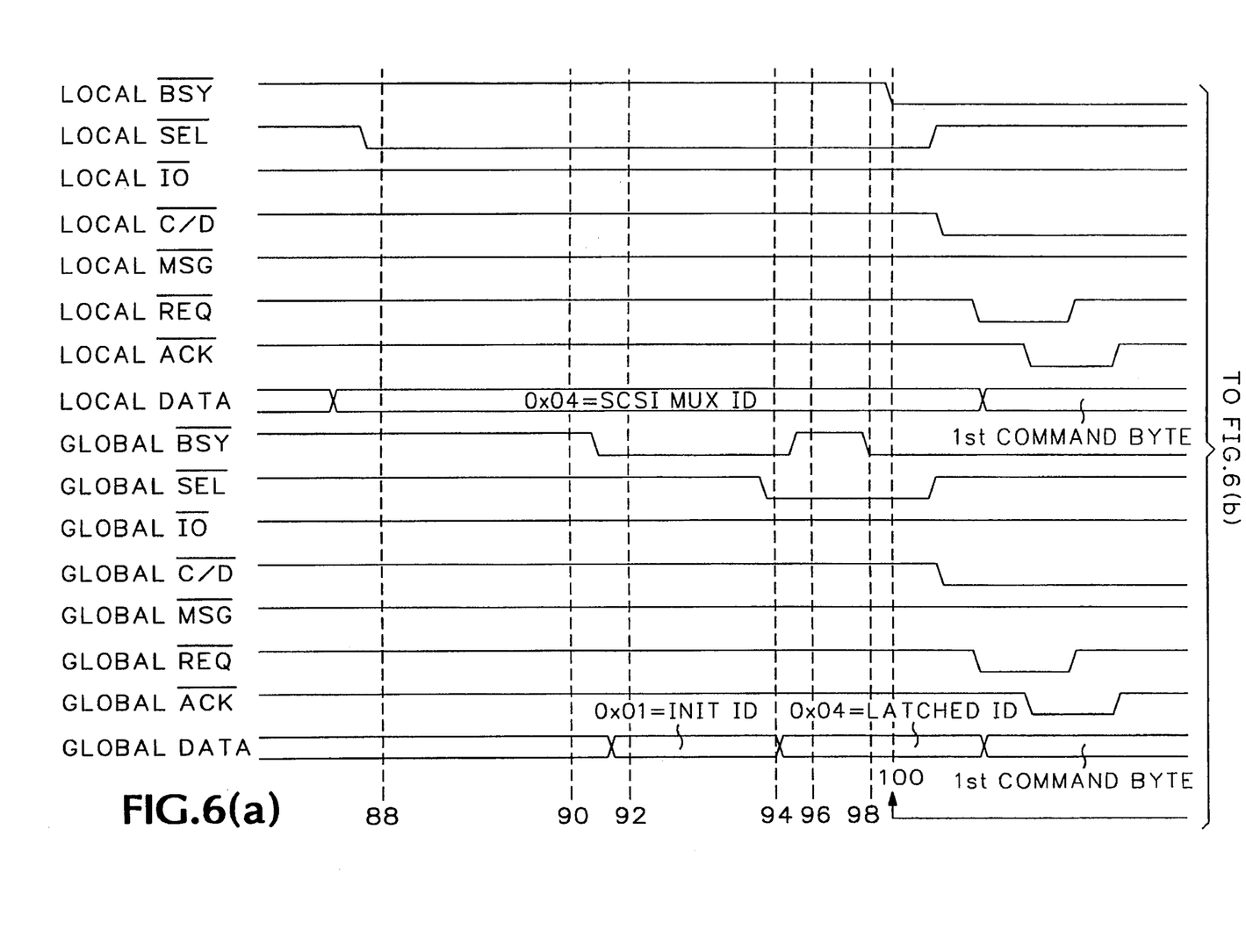
FIG. 6 is a timing diagram for arbitrating for and transferring data over the global bus via the SCSI MUX II according to the present invention.
Figure 6B:
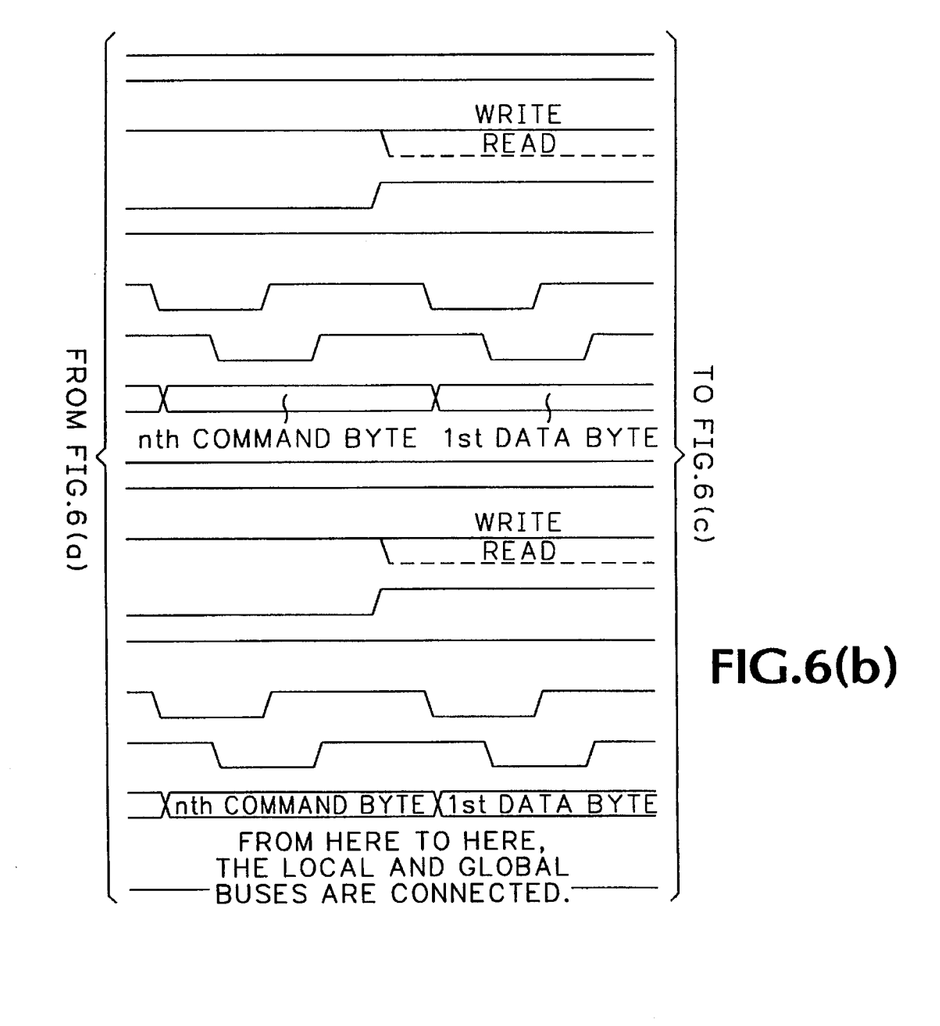
Figure 6C:
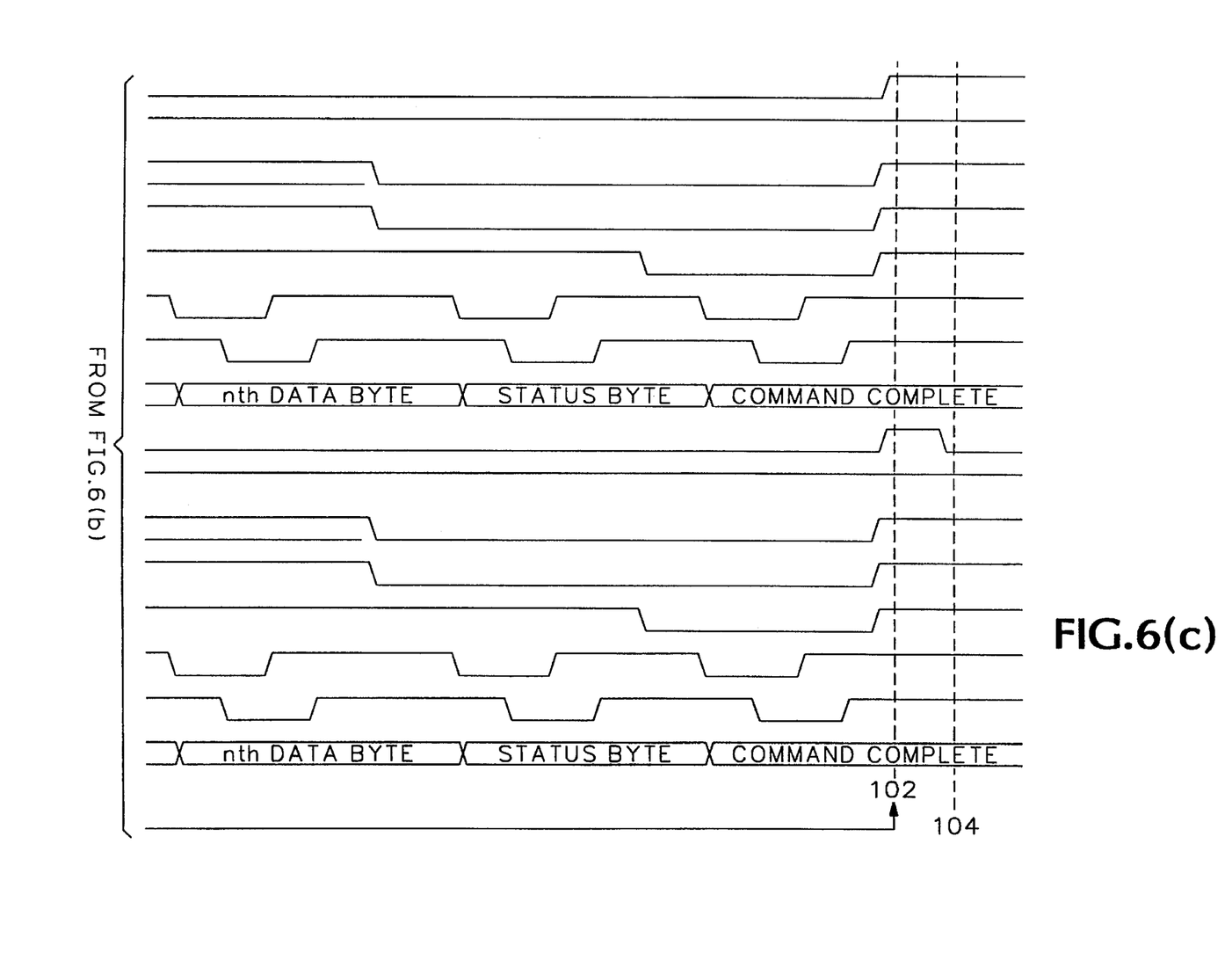

The SCSI Mux II 18 is now set up to receive a command to talk to the global device 22. The computer 12 starts the operation by driving the bit corresponding to the local ID of the SCSI Mux II 18, in this case 2, on the local data bus. It then asserts "SEL" at time 88 (FIG. 6). The SCSI Mux II 18 in response starts to arbitrate for the global bus 20, as shown in step 52 of FIG. 4. The SCSI Mux II 18 checks to see if the global bus 20 is free (step 54) by verifying that "BSY" and "SEL" are deasserted at time 90 for a specified period, such as 5 uSecs. If this is true, then SCSI Mux II 18 asserts "BSY" at time 92 and drives bit 0, selected by the global ID switch 44, on the global bus 20. A second specified time later, such as 3 uSecs, the SCSI Mux II 18 checks to see if the highest bit on the global bus 20 that has a logical "1" is equal to the bit selected by the global ID switch 44. If it is the SCSI Mux II 18 has won the arbitration, and then drives the ID from the bus ID translation latch 42 onto the global bus 20 and asserts "SEL" at time 94. The SCSI Mux II 18 releases the global "BSY" at time 96, and the selected global device 22 responds to this sequence by asserting "BSY" at time 98. At this point the SCSI Mux II 18 connects the local and global buses 14, 20 at time 100.

Figure 7A:
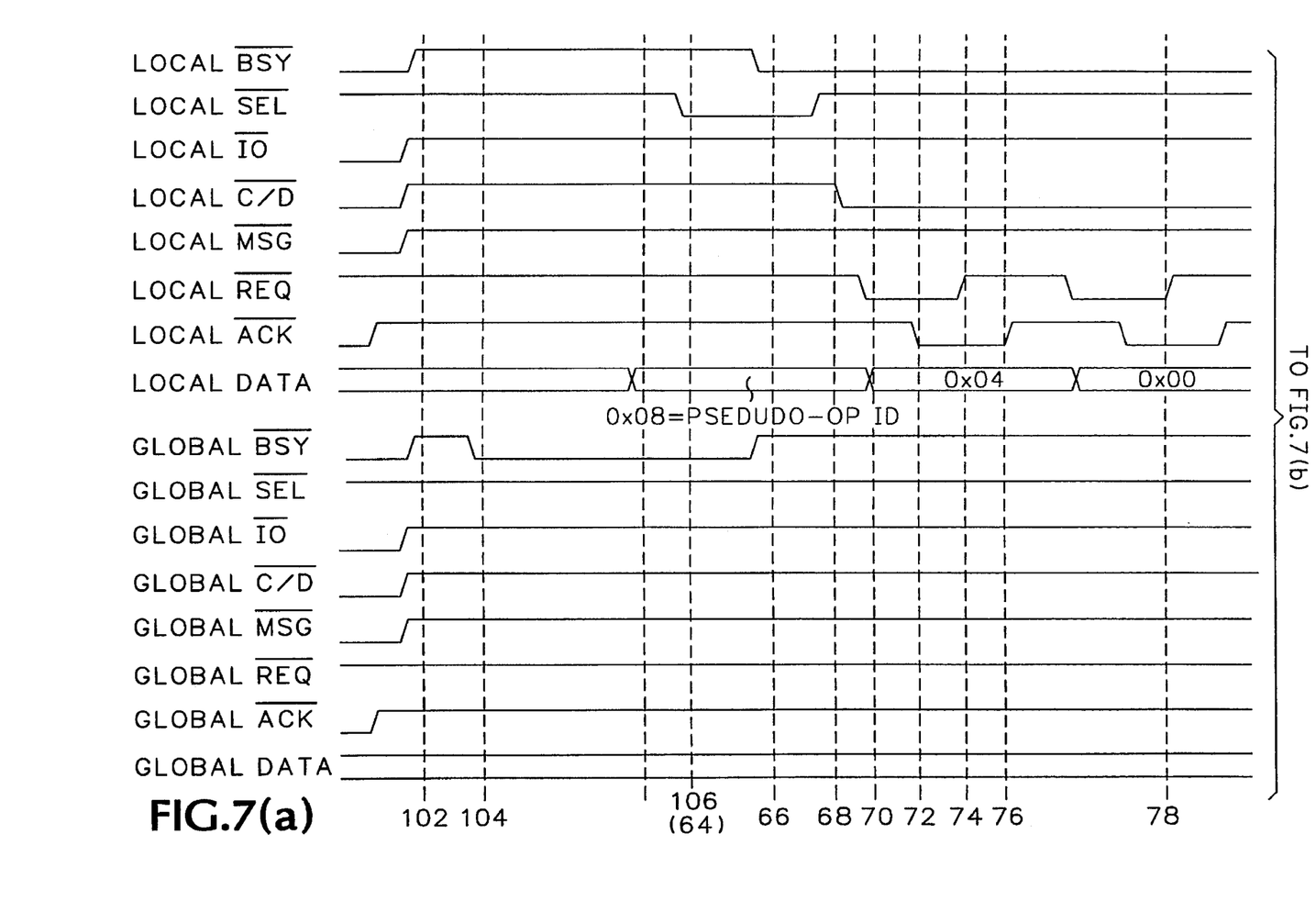
FIG. 7 is a timing diagram for releasing the global bus by the computer via the SCSI MUX II according to the present invention.
Figure 7B:
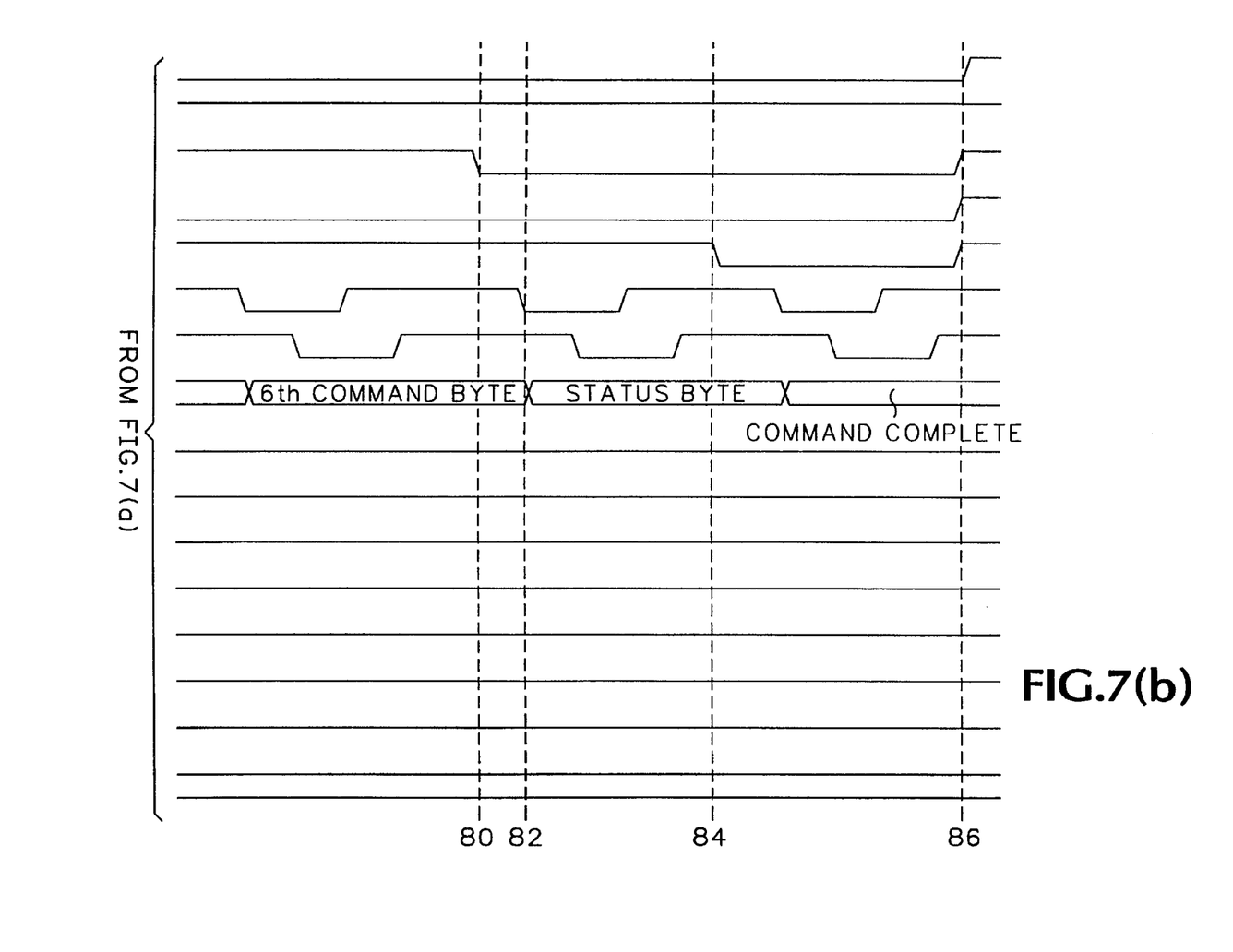

The computer 12 and global device 22 are now free to complete the transfer (step 56) according to SCSI specifications. When the transfer is complete, the global device 22 releases "BSY" on the global bus 20, and the SCSI Mux II 18 disconnects the local and global buses 14, 20 at time 102. If the lock bit is set in the control logic 40, the SCSI Mux II 18 immediately asserts "BSY" on the global bus 20 at time 104. Since the global bus 20 must be free for the specified interval, 5 uSecs, this locks out all other SCSI Mux IIs 18 from winning the arbitration for the global bus. The SCSI Mux II 18 waits for the computer 12 to assert "SEL" with its bus ID, starting the next transfer at time 106 (FIG. 7). The process then repeats for all desired transfers. This sequence may happen any number of times.

When the computer 12 is done (step 58), it releases the lock on the global bus 20 by running the pseudo-op code sequence again (step 60). As before the computer sends 0x08, the pseudo-op code, and asserts "SEL" at time (64). The SCSI Mux II 18 asserts local "BSY" and at the same time releases global "BSY", allowing other SCSI Mux IIs to win the global bus 20 at time (66).

Figures 8A, 8B:
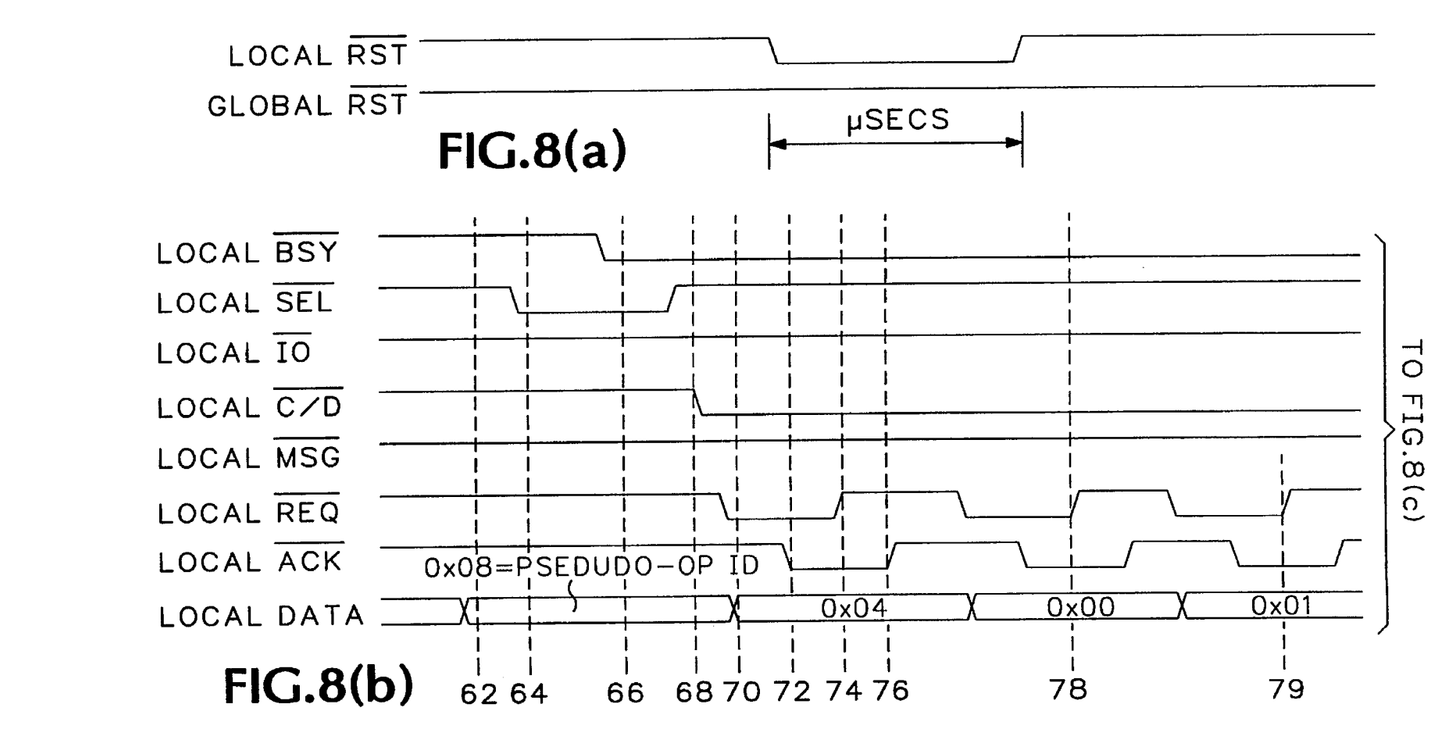
Figure 8C:
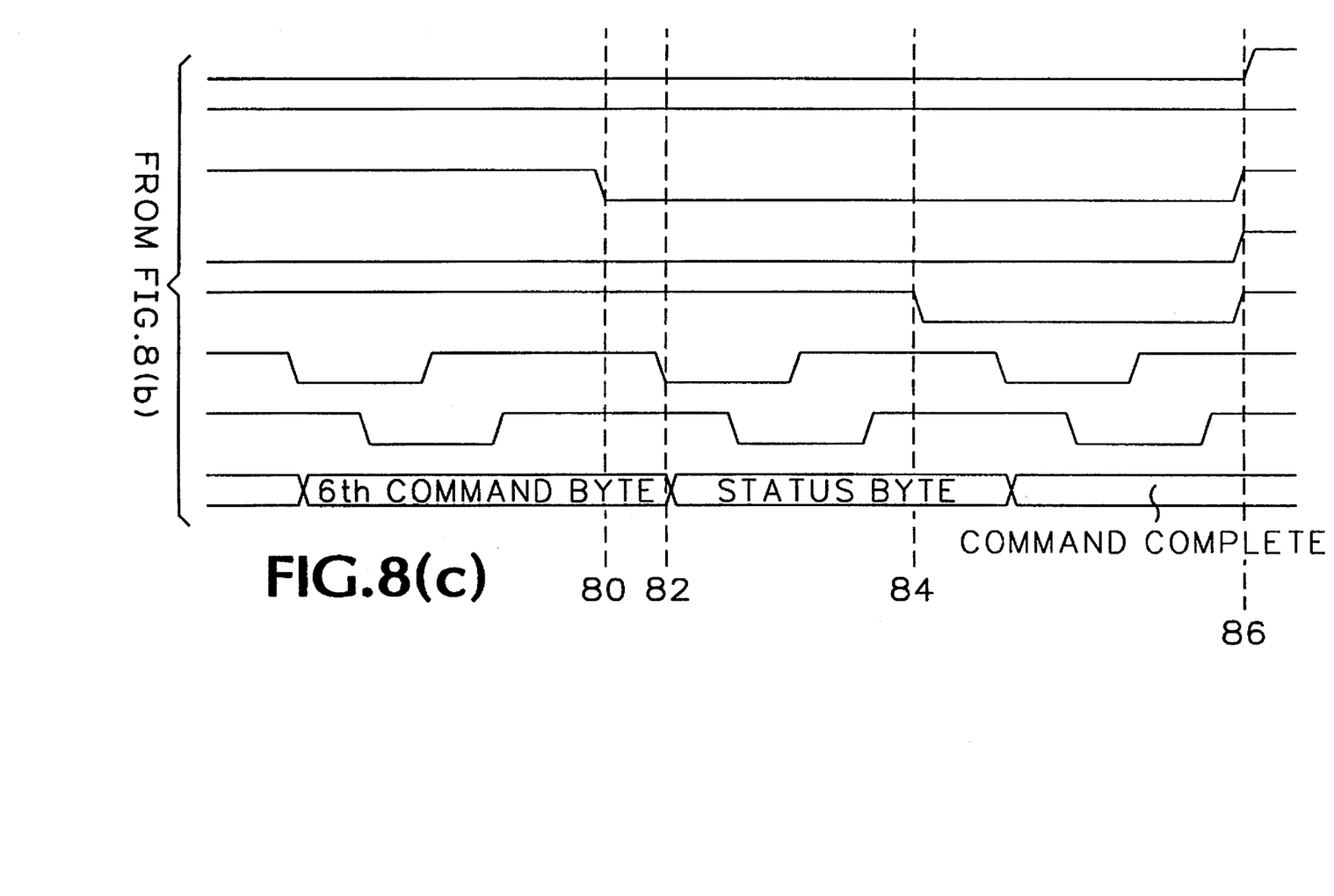
Figure 8D:
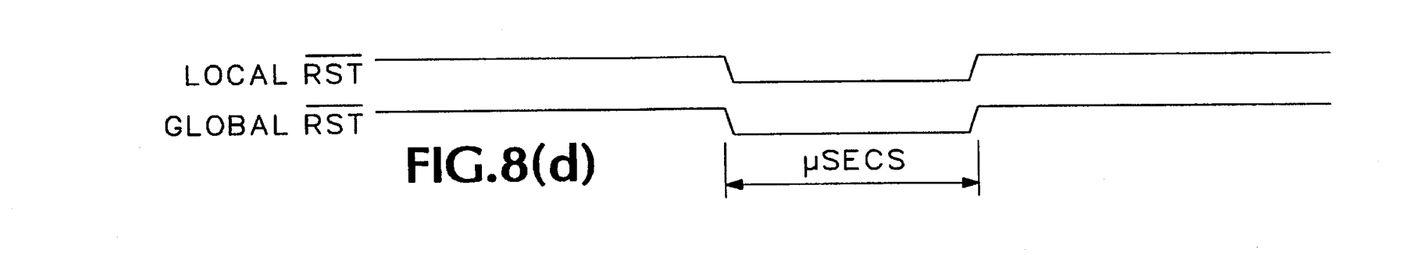

The SCSI Mux II 18 also handles both types of SCSI reset sequences as shown in FIGS. 8a)–8c), i.e., resetting all devices 16 on the local bus 14 only, including the SCSI Mux II, and resetting all devices 16, 22 on both the local and global buses 14, 20, including all SCSI Mux IIs. The first type is a normal SCSI reset where the RST signal is asserted for at least 25 uSecs and then deasserted FIG. 8a). However for the second type the minor bit of the third byte of the pseudo-op code sequence sets or clears a global reset flip-flop in the SCSI Mux II 18. When the global reset flip-flop is set, the local RST signal is connected as the global RST signal. The deasserting edge of the local RST signal clears the global reset flip-flop. Thus the sequence for doing a global reset is to send the pseudo-op code sequence FIG. 8b) with the minor bit of the third byte set, assert RST for the required 25 uSecs, and then deassert RST FIG. 8c).

Thus the present invention provides an improved small computer systems interface multiplexer (SCSI Mux II) for transferring information between a computer on a local bus and shared peripheral devices on a global bus using standard SCSI chips that do not allow "illegal" target identifications by using two local bus identification codes to indicate the SCSI Mux II that is to couple the local bus to the global bus.

What is claimed is:

1. A method of coupling a computer on a local bus with a shared peripheral device on a global bus via a multiplexer according to the small computer systems interface (SCSI) specification comprising the steps of:

sending a pseudo-op code from the computer to the multiplexer, the pseudo-op code containing a first local bus identification (ID) corresponding to a first local bus ID for the multiplexer, to initiate a pseudo-op code sequence to set up the multiplexer to receive a command to talk to the shared peripheral device;

transmitting from the computer a code corresponding to a second local bus ID of the multiplexer to start arbitration by the multiplexer for the global bus;

connecting the local bus to the global bus via the multiplexer when arbitration is won by the multiplexer;

transferring data between the computer and the shared peripheral device; and repeating the transferring step until the computer sends the pseudo-op code to the multiplexer to run the pseudo-op code sequence again to release the global bus.

* * * * *